Feb. 20, 1968 SUSUMU SEKI 3,370,281

SEMI-PERMANENT MEMORY DEVICE

Filed June 9, 1964 3 Sheets-Sheet 1

INVENTOR.
Susumu Seki

BY

Masteru & Masteru

FIG. 4(iii)
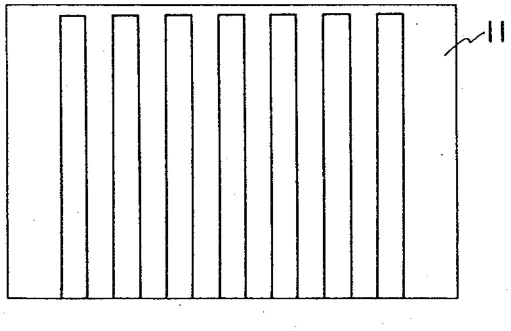
INVENTOR.
Susumu Seki
BY

INVENTOR.
Susumu Seki

BY

Mestern & Mestern

United States Patent Office 3,370,281

Patented Feb. 20, 1968

3,370,281

SEMI-PERMANENT MEMORY DEVICE

Susumu Seki, Kitatama-gun, Tokyo-to, Japan, assignor to Kabushiki Kaisha Hitachi Seisakusho, Tokyo-to, Japan, a joint-stock company of Japan Filed June 9, 1964, Ser. No. 373,754
Claims priority, application Japan, June 12, 1963, 38/30,022
1 Claim. (Cl. 340—174)

ABSTRACT OF THE DISCLOSURE

A semi-permanent memory device which comprises an electroconductive film having a magnetic saturation characteristic inserted between word drive lines and digit lines for shielding the electromagnetic coupling of each intersection of both lines, and permanent magnet pieces arranged above the intersections of both lines in accordance with information to be stored so as to greatly reduce the shielding effect of the film.

Figures 1A, 1B:
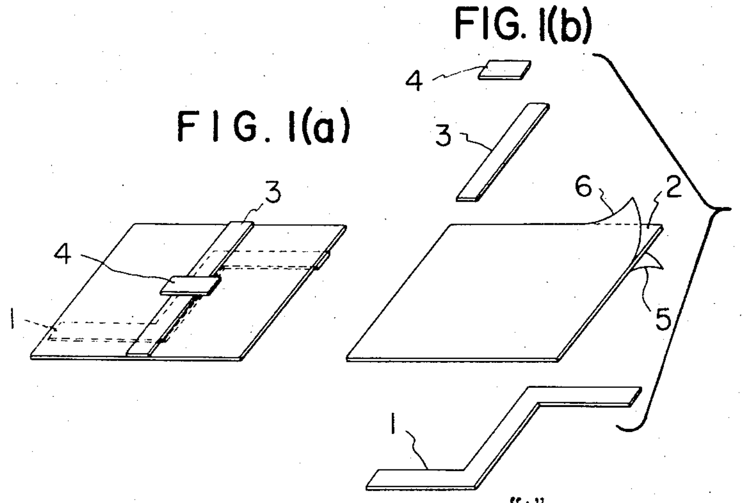

This invention relates to electronic memory devices and more particularly to a new and original, semi-permanent memory device with a large number of highly desirable features.

Among the known devices used heretofore as memories in digital computers, typical examples are the magnetic drum and the magnetic core matrix. These devices are characterized in that their respectively stored information can be read and written as desired by controlling the memory device by means of a control system in each computer.

On the other hand, however, among the various kinds of information such as programs and constants necessary for digital computers, there is a considerable number of those which not only do not require rewriting but, rather, should be prevented from being rewritten.

Consideration of this problem leads to the conclusion that the aforementioned conventional memories have the disadvantageous feature whereby they not only have wasteful capabilities for rewriting for the purpose of storing such information as mentioned above but also are constantly accompanied by the possible risk of losing information which must not be rewritten because of these capabilities.

In view of this conclusion, it is a general object of the present invention to overcome the above mentioned disadvantage.

More specifically, it is an object to provide a high-speed and reliable semi-permanent memory device of low cost which does not require the above mentioned rewriting and, moreover, can attain the purpose of storing information which should not be rewritten.

The foregoing objects and other objects and advantages as will be described hereinafter have been achieved by the present invention, which resides in a novel arrangement and construction of parts designed to store desired information through the utilization of the characteristic of an electroconductive film having a magnetic saturation characteristic, whereby its effective magnetic permeability with respect to a high-frequency magnetic field can be suitably varied by the superimposition of a static magnetic field.

Figures 2A, 2B:
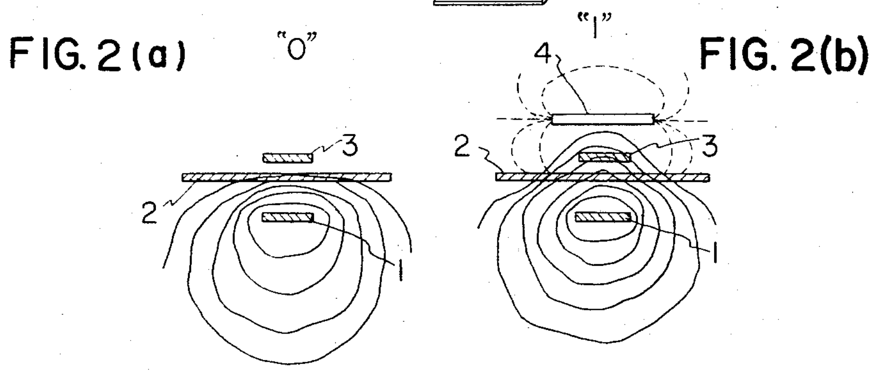
Figure 3A:
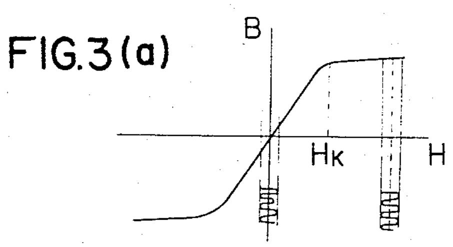
Figure 3B:
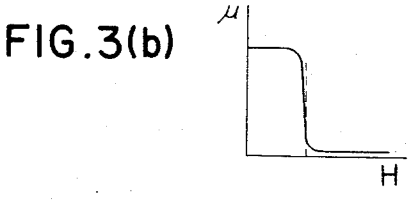
Figure 4I:
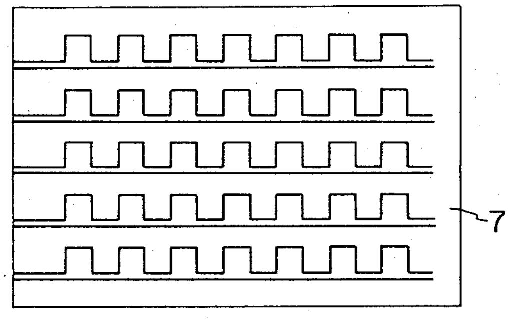
Figure 4:
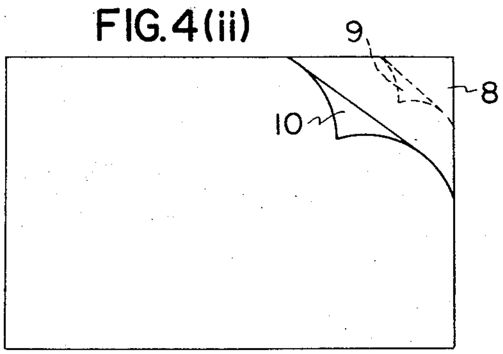
Figure 5I:
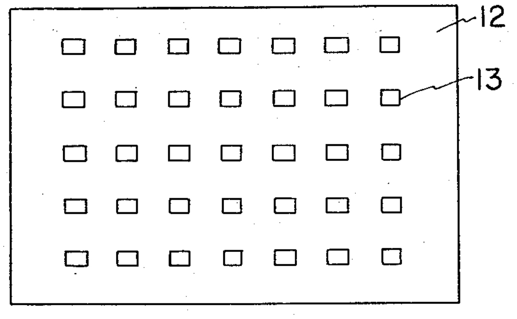
Figure 5:
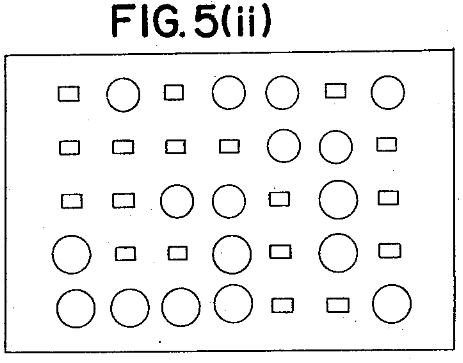
Figure 6:
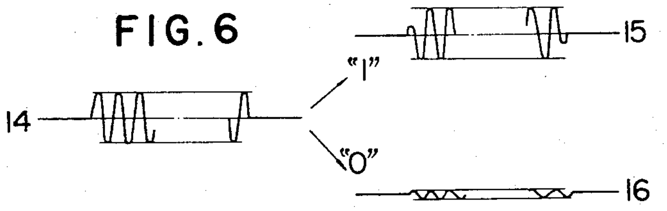
Figure 7:
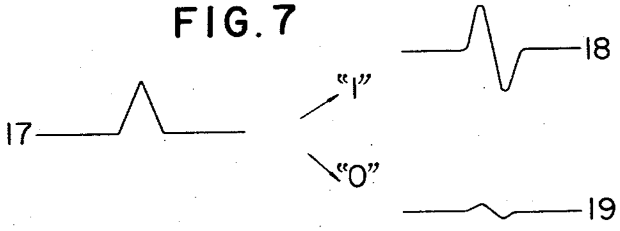

The specific nature, principle, and details of the invention will be more clearly apparent by reference to the following description, taken in conjunction with the accompanying drawings in which like parts are designated by like reference characters, and in which:

FIGURES 1(*a*) and 1(*b*) are simplified perspective views indicating the principle of the memory device of the invention, 1(*a*) showing the device in assembled state, and 1(*b*) in exploded state;

FIGURES 2(*a*) and 2(*b*) consist of two sectional views indicating the principle of operation of the memory device of the invention;

FIGURES 3(*a*) and 3(*b*) are graphical representations also indicating the operation principle of the memory device of the invention;

FIGURES 4(*i*), 4(*ii*), 4(*iii*), 5(*i*) and 5(*ii*) are diagrammatic views, each indicating the arrangement and construction of an embodiment of the invention; and FIGURES 6 and 7 are waveform charts indicating the character of the input high-frequency currents respectively in the embodiments shown in FIGURES 4 and 5.

The construction and operational principle of the memory device of this invention will first be described hereinbelow. Referring first to FIGURE 1, there is shown a unit of the memory device of the invention, said unit corresponding to one bit. This unit comprises a word drive line 1, an electroconductive film 2 (for example, permalloy) having a magnetic saturation characteristic, a digit line 3, a permanent magnet 4, and insulating films 5 and 6 respectively for electrically insulating the word drive line 1 from the film 2 and the film 2 from the digit line 3.

When, in the memory device of the above described construction, a high-frequency electrical curent is applied to the word drive line 1, a high-frequency magnetic field is created about the word drive line 1. This high-frequency magnetic field is shielded by hte electroconductive film 2 in the proximity and decreases rapidly in strength as the distance within the film relative to the word drive line 1 increases.

In this case, for the purpose of obtaining a rough estimation of this shield effect, a magnetic field parallel to the film 2 is considered as the magnetic field due to the high frequency current passing through the word drive line 1, the strength of the magnetic field within the film becomes, as is well known, approximately 1/2.7 for each increase in distance represented by the equation $$\delta=\sqrt{\frac{1}{\pi f \mu \sigma}}$$

where: $\mu$ is the magnetic permeability (H./m.) of the film 2; $\sigma$ is its electric conductivity (Ω/m.) and $f$ is the frequency (c./s.) of the high-frequency curent applied to the word drive line 1.

In the case where, in the above described manner, a conductive film 2 of the same thickness is used for the same high-frequency magnetic field, the aforementioned shield effect increases with increase in the magnetic permeability of the film or with increase in the electric conductivity thereof, as is also known. Therefore, if it were possible to cause, from the outside, the magnetic permeability of the film to vary equivalently, it would be possible, in the case when a high-frequency current is passed through the word drive line 1, to vary the magnitude of the high-frequency magnetic field created on the side of the digit line 3 through the film 2, and it would be possible thereby to cause a two-value change in the voltage induced in the digit line 3.

For example, if the B–H curve of the conductive film 2 is as indicated in FIGURE 3(*a*), the effective permeability $\mu$ of such a film with respect to an A-C magnetic field varies greatly as indicated in FIGURE 3(*b*) depending on the magnitude of the static magnetic field superimposed on the A-C magnetic field. Then, by applying a strength H*k* of the magnetic field with respect to the saturation point of this B–H curve, it is possible to reduce rapidly the value of $\mu$ with respect to the alternating field (in general, of high frequency).

The permanent magnet 4 shown in FIGURES 1 and 2 is used for this purpose. That is, depending on the presence or absence of this permanent magnet, the effective magnetic permeability $\mu$ of the film 2 with respect to the alternating magnetic field is caused to vary to produce two values, and the magnitude of the voltage induced in the digit line 3 by the high-frequency current passing through the word drive line 1 is determined. Accordingly, it is possible to store "1" and "0" whereby the desired result is attained.

An example of a semi-permanent memory device wherein a large number of memory elements, each as described above, is used is shown in FIGURES 4 and 5. The essential parts of this device are as shown respectively in FIGS. 4(*i*), (*ii*) and (*iii*), word drive lines 7 fabricated on a substrate by etching, evaporation deposition, or some other method, an electroconductive film 8 as described hereinbefore, electrically insulating films 9 and 10, and digit lines 11 formed on a substrate similar to that on which the word drive lines 7 are formed. By superimposing these parts, a memory device equivalent to that shown in the aforementioned FIGURE 2(*a*) is formed at each intersection of the word drive lines 7 and digit lines 11.

Additionally prepared are a film 12 of non-magnetic material and permanent magnets 13 in film form fabricated by coating or evaporation deposition on the film 12 as shown in FIGURE 5(*i*). By superimposing these parts 12 and 13 on the superimposed combination of the above described parts 7, 8, 9, 10, and 11, it is possible to produce readily a construction wherein a static magnetic field is superimposed over each intersection of the word drive lines 7 and digit lines 11 as indicated in FIGURE 2(*b*).

To store desired information in the device of the above description, specific permanent magnets are appropriately removed by means such as a perforator as indicated by circles in FIGURE 5(*ii*), and the states of the corresponding memory elements are caused to be the "0" state as indicated in FIGURE 2(*a*). At this time, the parts with permanent magnets are, of course, in the "1" state as indicated in FIGURE 2(*b*).

Another method for attaining an equivalent operational effect is to demagnetize, once, all permanent magnets shown in FIGURE 5(*i*) and then to magnetize only the magnets corresponding to the parts in which "1" is to be stored. The essential condition in all cases is that the static magnetic field be applied to the parts corresponding to the "1" state and that almost none of it be applied to the parts corresponding to the "0" state.

Furthermore, in the above description, the case where a high-frequency current is passed through the word drive line has been considered, in which case the input and output relationship is as shown in FIGURE 6. That is, when a high-frequency current having a waveform as indicated by 14 is passed through a specific word drive line, a voltage waveform as indicated by 15 is induced in the digit lines corresponding to "1," and a voltage waveform as indicated by 16 is induced in the digit lines corresponding to "0."

In this memory device, however, it is not necessary in all cases that the input current waveform be that described above. The input may have a current waveform such as, for example, that indicated by 17 in FIGURE 7. In this case, the "1" output assumes the waveform indicated by 18, and the "0" output assumes the waveform indicated by 19. The essential condition, here, is that an input of a waveform containing a large number of high-frequency components such that identification between "1" and "0" becomes possible be used.

From the above description, it will be apparent to those skilled in the art that, by the use of the unique arrangement and construction of parts according to this invention, a great number of practical advantages can be gained. The principal advantages afforded by the invention may be enumerated as follows:

(1) The arrangement and construction of the entire memory device are simple and economical. Furthermore, since there are almost no mechanically contacting parts, the operation is extremely positive, and, moreover, the device has high durability and long life.

(2) The variation of the shielding effect due to the difference between the double values of the magnetic permeability with respect to a high-frequency magnetic field, depending on the presence or absence of a preset static magnetic field, is utilized, whereby the operation is extremely rapid.

(3) By causing the coercive force of the permanent magnets to be sufficiently high, there is no possibility of the magnetic charge of the permanent magnets being lost because of the magnetic field due to the A-C current flowing through the word drive lines or because of an external magnetic field, and the stored information can be positively preserved.

(4) The stored information can be readily changed by changing the film of the permanent magnets.

(5) By grounding (connecting to earth) the electroconductive film, capactive coupling between the word drive lines and the digit lines can be eliminated.

It should be understood, of course, that the foregoing disclosure relates to a preferred embodiment of the invention and that it is intended to cover all changes and modifications of the example of the invention herein chosen for the purposes of the disclosure, which do not constitute departures from the spirit and scope of the invention as set forth in the appended claim.

I claim:

1. A semi-permanent memory device comprising: a plurality of parallel word drive lines, disposed in a plane, to each of which an electrical signal containing a required alternating current component is applied; a plurality of parallel digit lines disposed over the word drive lines so as to form a matrix arrangement with intersections of the digit lines and the word drive lines, thereby to produce electromagnetic couplings between the word drive lines and the digit lines at the respective intersections; an electroconductive film means having a magnetic saturation characteristic inserted between the word drive lines and the digit lines for shielding said electromagnetic couplings; a plurality of permanent magnet pieces disposed above selected ones of said intersections so as to greatly reduce the shielding effect by said electroconductive film and said magnetic pieces being arranged so as to form a pattern corresponding to information to be stored, whereby output signals according to said pattern are induced in said digit lines in response to the electrical signals through said word drive lines.

References Cited

UNITED STATES PATENTS

| | | | |
|---|---|---|---|
| 3,061,821 | 10/1962 | Gribble et al. | 340—174 |
| 3,133,271 | 5/1964 | Clemons | 340—174 |
| 3,199,089 | 8/1965 | Astrove et al. | 340—174 |
| 3,060,411 | 10/1962 | Smith | 340—174 |
| 3,201,767 | 8/1965 | Bradley | 340—174 |

TERRELL W. FEARS, *Primary Examiner.*

STANLEY M. URYNOWICZ, *Examiner.*